UNITED STATES PATENT OFFICE.

PAUL SCHICKLER AND HANS HAHL, OF ELBERFELD, GERMANY, ASSIGNORS TO FARBENFABRIKEN VORM. FRIEDR. BAYER & CO., OF ELBERFELD, GERMANY, A CORPORATION OF GERMANY.

MONOCINNAMIC ESTER OF GLYCOL.

1,000,040.  Specification of Letters Patent.  Patented Aug. 8, 1911.

No Drawing.  Application filed May 2, 1911. Serial No. 624,609.

*To all whom it may concern:*

Be it known that we, PAUL SCHICKLER and HANS HAHL, doctors of philosophy, chemists, citizens of the German Empire, residing at Elberfeld, Germany, have invented new and useful Improvements in Monocinnamic Esters of Glycol, of which the following is a specification.

We have found that the new mono-cinnamic ester of glycol can be obtained by esterification of cinnamic acid with glycol.

The new ester has proved to be an excellent remedy against scabies. It possesses the advantage over Peru balsam hitherto used for this purpose that it is odorless, non-irritant and easily soluble.

In order to illustrate the new process more fully the following example is given the parts being by weight:—250 parts of cinnamic acid are heated with 500 parts of glycol and 190 parts of concentrated sulfuric acid (60° Bé.) in an oil bath for 36 hours to 140° C. The melt is then extracted with ether and the ethereal solution is shaken with soda solution until it shows a slightly alkaline reaction. The ethereal solution is then dried, the ether is removed and the residue distilled *in vacuo*. The ester thus obtained boils under a pressure of 11 mm. at from 190–195° C. It is a colorless and odorless oil.

We claim:—

The herein described glycol cinnamic ester of the formula

$$C_6H_5-CH=CH-COO.CH_2-CH_2-OH$$

which is a colorless and odorless oil boiling at 190–195° C. under a pressure of 11 mm.; and being a valuable remedy against scabies, substantially as described.

In testimony whereof we have hereunto set our hands in the presence of two subscribing witnesses.

PAUL SCHICKLER. [L. S.]
HANS HAHL. [L. S.]

Witnesses:
CHAS. J. WRIGHT,
ALFRED HENKEL.